(12) United States Patent
Flickinger et al.

(10) Patent No.: US 7,803,040 B1
(45) Date of Patent: Sep. 28, 2010

(54) CONCAVE ADJUST ASSEMBLY INCLUDING A TORSION AXLE FOR DAMPING CROP THRESHING IMPULSE LOADS

(75) Inventors: Wayne T. Flickinger, Oxford, PA (US); Nathan E. Isaac, Lancaster, PA (US); Robert A. Matousek, Milan, IL (US); Bryan S. Claerhout, Hesston, KS (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/425,878

(22) Filed: Apr. 17, 2009

(51) Int. Cl.
*A01F 12/28* (2006.01)

(52) U.S. Cl. ..................................... 460/109

(58) Field of Classification Search ............... 460/109, 460/107, 108, 104, 59, 72
See application file for complete search history.

(56) References Cited

U.S. PATENT DOCUMENTS

| 509,490 | A | | 11/1893 | Richter |
| 724,855 | A | | 4/1903 | Haertlein |
| 740,215 | A | | 9/1903 | Bartholow |
| 918,285 | A | | 4/1909 | Clark |
| 1,857,265 | A | | 5/1932 | Stephens |
| 2,053,148 | A | * | 9/1936 | James ................... 460/67 |
| 2,484,228 | A | | 10/1949 | Isay |
| 3,470,881 | A | * | 10/1969 | De Pauw et al. ............ 460/109 |
| 3,871,384 | A | * | 3/1975 | Depauw et al. ............. 460/109 |
| 3,974,837 | A | | 8/1976 | Applegate |
| 4,330,000 | A | | 5/1982 | Peiler |
| 4,484,588 | A | | 11/1984 | Huhman et al. |
| 4,774,968 | A | * | 10/1988 | Spanlang ................... 460/109 |
| 4,805,643 | A | * | 2/1989 | Tetaka ..................... 131/311 |
| 5,489,239 | A | * | 2/1996 | Matousek et al. ............ 460/62 |
| 6,358,142 | B1 | * | 3/2002 | Imel et al. ................. 460/109 |
| 6,443,835 | B1 | * | 9/2002 | Imel et al. ................. 460/107 |
| 6,485,365 | B2 | * | 11/2002 | Imel et al. ................. 460/119 |
| 6,503,142 | B2 | * | 1/2003 | Imel et al. ................. 460/107 |
| 6,530,833 | B2 | * | 3/2003 | Imel et al. ................. 460/109 |
| 6,758,745 | B2 | * | 7/2004 | Van Der Haegen et al. . 460/109 |
| 6,958,012 | B2 | | 10/2005 | Duquesne et al. |
| 7,059,961 | B2 | * | 6/2006 | Schenk ..................... 460/109 |
| 7,118,475 | B2 | * | 10/2006 | Schenk ..................... 460/109 |
| 7,226,355 | B2 | * | 6/2007 | Schenk ..................... 460/109 |
| 7,393,274 | B2 | * | 7/2008 | Voss et al. .................. 460/109 |

\* cited by examiner

*Primary Examiner*—Árpád Fábián-Kovács
(74) *Attorney, Agent, or Firm*—Michael G. Harms; Patrick M. Sheldrake (57) ABSTRACT

The concave adjust assembly uses a torsion axle connecting a drive to a concave. The torsion axle includes an inner element having an angular sectional shape, a tubular outer element disposed about the inner element and having a larger angular sectional shape oriented such that corners of the tubular element are disposed opposite flats of the inner element, the elements being laterally relatively rotatable, and damping elements disposed between the inner and outer elements such that the rotation will compressively load the damping elements. The drive includes a motor, such that operation of the motor will adjustably move the concave, and the damping elements will damp impulse loads generated from threshing, to reduce transmission of the loads to the drive.

20 Claims, 6 Drawing Sheets

Fig. 1

(PRIOR ART)

Fig. 2

(PRIOR ART)

CONCAVE ADJUST ASSEMBLY INCLUDING A TORSION AXLE FOR DAMPING CROP THRESHING IMPULSE LOADS

TECHNICAL FIELD

This invention relates generally to apparatus for adjustably supporting a concave of threshing apparatus of an agricultural combine, and more particularly, to a concave adjust assembly utilizing a torsion axle for damping impulse or shock loads generated from threshing crops.

BACKGROUND ART

An agricultural combine generally includes a threshing system including at least one concave disposed about a threshing rotor of the system. A gap will be located between the concave and rotor, and is desirably variable for accommodating different crops and conditions. In particular, it has become a desirable feature to have a capability to remotely adjust the gap just before and during operation of the combine. To meet this desire, concave adjust assemblies or mechanisms have been developed to allow concave gap adjustments to be made by the combine operator or another person using a suitable input device or switch, located in the operator cabin or another location, and some systems allow the adjustments to be made automatically. Such adjust assemblies or mechanisms typically include a motor in driven relation to a gear train in connection with the concave, operation of which can be used for precisely adjusting or setting the concave gap.

A problem that has been discovered with use of such remote concave adjust assemblies, however, is that threshing forces generated by the rotation of the rotor and resulting impacts with the crop material during threshing, can be transmitted through the concave and the apparatus in support thereof, e.g., linkages, cross bar, etc., to elements of the concave adjust assembly, resulting in breakage and/or failure thereof. It has been found that the threshing forces, particularly those resulting from intermittently occurring plugs or slugs of crop material, can translate into repeating impulse or shock loads which have a jack hammering effect on the adjust assembly elements of the adjust assembly which can cause fatigue failures over time.

What is sought therefore, is an apparatus for a concave adjust assembly, which provides the desired concave adjustability, and which overcomes one or more of the problems set forth above.

SUMMARY OF THE INVENTION

What is disclosed is a concave adjust assembly which provides a desired concave adjustability, and which includes a torsion axle for absorbing impulse or shock loads, and thus overcomes one or more of the problems set forth above.

According to a preferred aspect of the invention, the torsion axle includes an elongate inner element having an angular sectional shape and opposite longitudinal ends configured for connection to spaced apart portions of a threshing system concave. An elongate tubular outer element is disposed about the inner element and also has an angular sectional shape, but is of larger sectional extent than the inner element. The tubular outer element is oriented relative to the inner element such that corner portions of an inner surface of the outer element are disposed in generally opposing relation to flat portions of an outer surface of the inner element and define spaces therebetween, and such that the outer element and the inner element are laterally relatively rotatable. The torsion axle includes elongate resilient damping or biasing elements disposed in the spaces between the inner and outer elements, respectively, such that when the lateral relative rotation of the inner and outer elements occurs, the inner and outer elements will bear against the damping elements to load them in compression. The adjust assembly additionally includes a drive having a gear mounted on an outer surface of the tubular outer element, enmeshed with a gear on an output shaft of a motor fixedly mountable to structure of a combine such as a housing of the threshing system, such that operation of the motor will relatively rotate the enmeshed gears.

In operation, with the ends of the inner element of the torsion axle connected in support of a concave of the threshing system of a combine and the drive mounted to suitable structure of the combine, the motor can be operated for adjusting the position of the concave relative to an adjacent rotor. Then, as slugs or other impulse or shock load generating conditions are encountered during threshing, the resulting impulse or shock loads will be transmitted through the inner element to the damping elements so as to be damped and dissipated, to substantially reduce or prevent transmission of potentially damage causing impulse loads to the outer element of the torsion axle, and thus to the drive.

As an attendant advantage of the invention, occurrences of damage to, and failure of, the drive are reduced. As another advantage, loads exerted by the concave against one end of the inner element can be opposed and damped by the torsional resiliency of that element in combination with the resiliency of the damping elements, so as to result in minimal impulse load transmission to the outer elements and the drive. As a further advantage, the composition and construction of the damping elements can be selected such that loads exerted thereagainst by just the weight of the concave will not result in significant deformation thereof, to enable precise adjustments of the concave position, and such that any deformation of the damping elements caused by the exertion of the impulse loads thereagainst will be distributed and in a direction which only minimally affects the concave setting, and will be effectively damped and dissipated.

As additional preferred aspects of the invention, to facilitate the attendant advantages, the inner and outer elements of the torsion axle can be of rectangular sectional shape, and the damping elements can comprise cords of a resilient biasing material, such as an elastomeric material, such as natural and/or synthetic rubber, of a selected firmness which provides the required or desired damping capability.

DETAILED DESCRIPTION OF THE INVENTION

Figure 1:
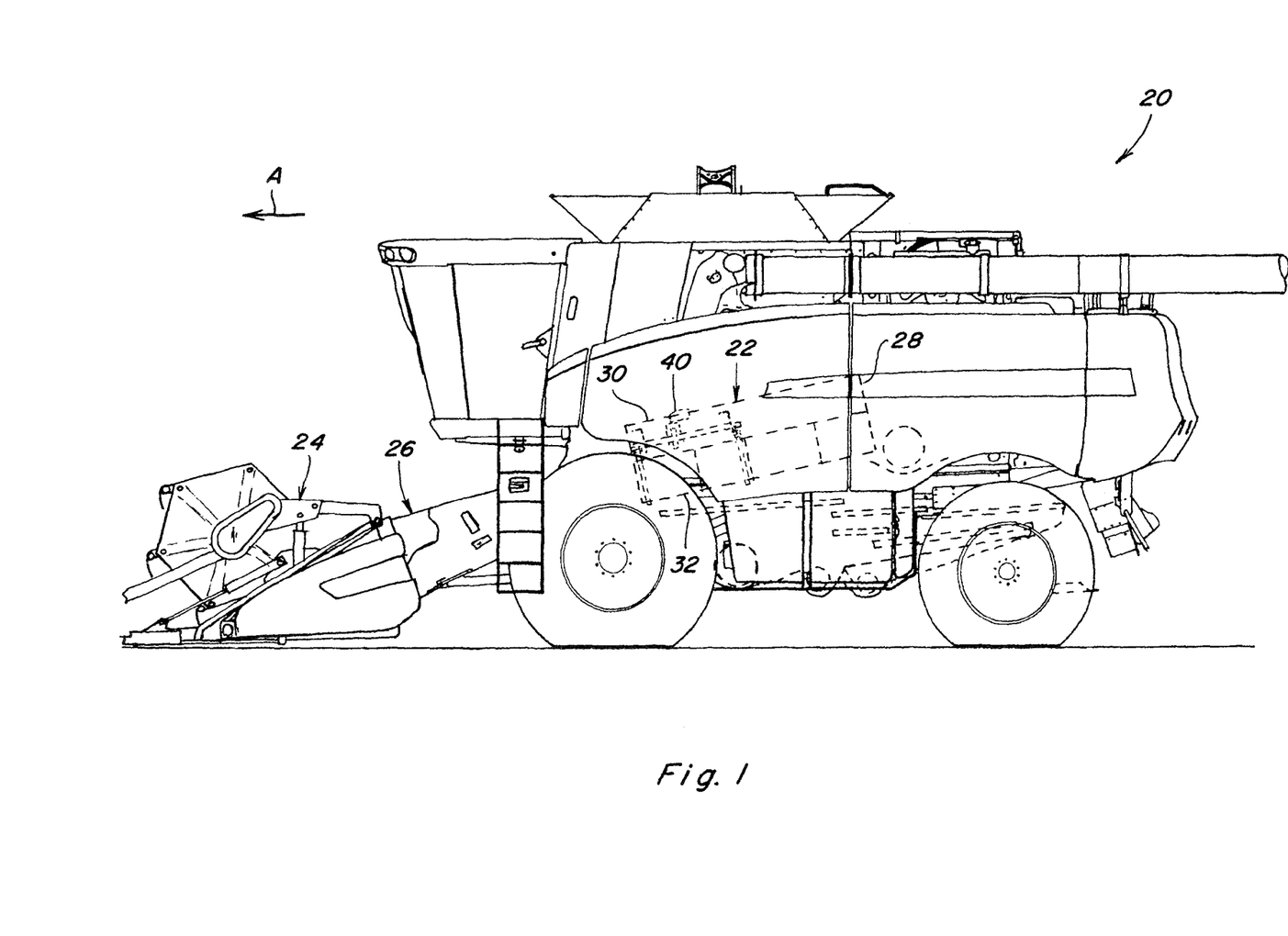
FIG. 1 is a simplified side view of an agricultural combine, including a representative threshing system including a concave adjust assembly for adjusting the position of a concave thereof.

Referring to FIG. 1, a representative self-propelled combine 20 is shown, including a threshing system 22 constructed and operable for threshing crop material cut by a header 24 and conveyed to threshing system 22 via a feeder 26, as combine 20 moves in a forward direction, denoted by an arrow A, over a field, in the well known manner. Generally, threshing system 22 includes at least one elongate, generally cylindrical rotor 28 rotatable about a longitudinal axis thereof within, and relative to, a cylindrical tube or housing 30, a lower portion of which housing 30 comprises a concave 32. Concave 32 is typically constructed so as to have a plurality of orifices or apertures therethrough, sized for passage of crops, e.g., grain, legumes, etc., therethrough, as well as smaller particles and elements of crop material other than grain (MOG), en route to a cleaning system of combine 20 disposed below threshing system 22, again, in the well known manner.

Referring also to FIGS. 3, 4, 6, 8, 9 and 10, typically, a concave such as concave 32, will be configured and supported hingedly on one side and on the other side so as to be movable generally radially relative to rotor 28 for adjusting a space or gap 34 between an outer cylindrical surface 36 of rotor 28, and an inner cylindrical surface 38 of concave 32, as is also well known. Harvested crop material will be formed into a mat as it enters the threshing system so as to essentially wrap about rotor 28 within gap 34 and so as to be conveyed by the rotation of rotor 28 in a helical manner through gap 34, for separating the grain and smaller elements of MOG from larger elements of the MOG, e.g., straw, stalks, cob fragments, etc., which are then discharged from the rear end of the threshing system.

Figure 2:
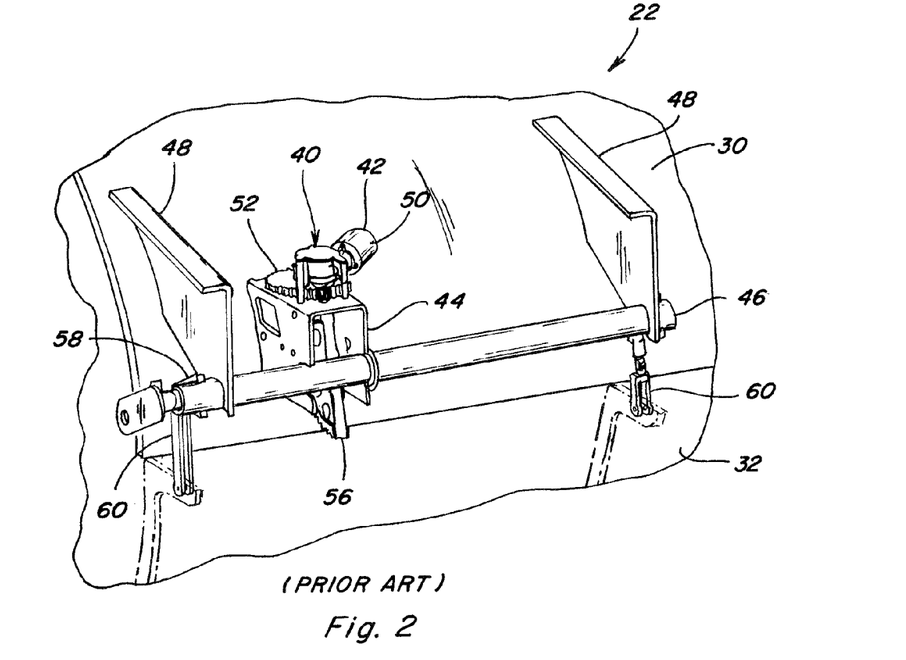
FIG. 2 is an enlarged fragmentary perspective view of elements of the representative threshing system including a prior art concave adjust assembly.
Figure 3:
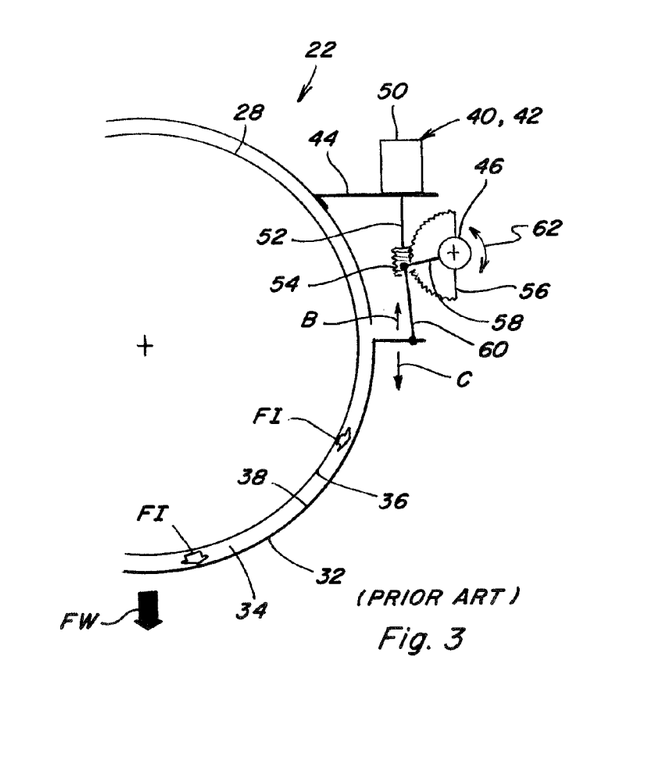
FIG. 3 is an enlarged simplified schematic end view of the representative threshing system and prior art concave adjust assembly, illustrating the effect of representative impulse loads exerted thereagainst.
Figure 4:
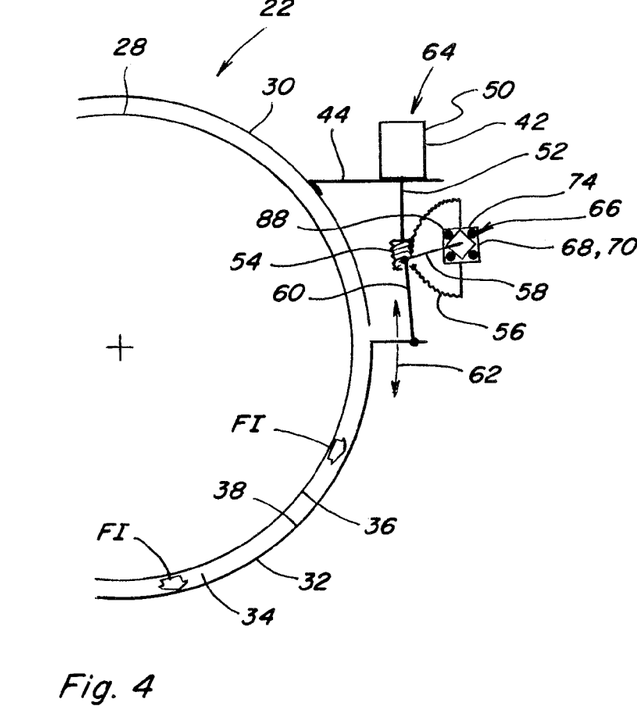
FIG. 4 is an enlarged simplified schematic end view of the representative threshing system including a concave adjust assembly including a torsion axle of the invention, and illustrating impulse loads exerted thereagainst.

As illustrated in FIGS. 2 and 3, it is known to provide apparatus for adjusting gap 34 from a remote location, such as, but not limited to, an operator cabin of the combine. An exemplary known prior art concave adjust assembly 40 operable for doing this is shown. Prior art concave adjust assembly 40 includes a drive 42 fixedly supported by an inverted U-shape bracket 44 in cantilever relation on a side of housing 30 of threshing system 22, or other fixed structure of combine 20 above and radially outwardly of concave 32. Concave adjust assembly 40 additionally includes an elongate axle 46 of suitable material such as tubular or bar steel, supported for lateral rotation about a longitudinal axis therethrough by brackets 48 on housing 30 or other suitable structure of the combine, so as to extend in a generally fore and aft direction just above and outwardly of concave 32, and below drive 42. Drive 42 includes a motor 50, which is typically an electrically powered stepping motor or actuator, having a rotatable output 52, which here is a gear train including an output gear 54 which is a worm gear. Gear 54 is enmeshed with a gear 56 extending partially about axle 46. The ends of axle 46 include cantilever arms 58 fixed thereto, which are connected by linkages 60 to opposite ends of concave 32, for supporting that side of the concave.

In operation, at the onset of a harvesting operation, and from time to time for any of a variety of factors, it will be desired to change the size of gap 34. To accomplish this from a remote location, motor 50 of assembly 40 is configured so as to be controllably operated to rotate output 52, to relatively rotate gears 54 and 56, and thus axle 46, in either direction, as denoted by arrow 62 in FIG. 3. As a result, the rotation of axle 46 in a clockwise direction will adjustably lift concave 32, as denoted by arrow B, to move it closer to rotor 28, and thereby reduce gap 34, while rotation in the counterclockwise direction will lower the concave (arrow C) to increase gap 34. When a desired concave position and gap have been achieved, motor 50 will hold the concave in that position. At essentially all times, a portion of the weight of concave 32 will exert a static downwardly directed force FW, which will be transmitted through linkages 60 to arms 58, and thus to axle 46 of assembly 40. Force FW will thus be transmitted by axle 46 to gear 56 thereon, to urge rotation of gear 56 in the counterclockwise direction, denoted by the upwardly directed portion of arrow 62, so as to be opposed or supported by motor 50. Pressures exerted by a crop mat (not shown) within gap 34 will exert forces in the same direction, depending on the density and consistency of the mat, so as also to be opposed by motor 50. Thus, normally, these forces will oppose any lifting movements of concave 32 by motor 50, and will result in application of shear loads on the teeth of gears 54 and 56, and, because of the mounting arrangement of motor 50, bending loads on bracket 44.

Additionally, as discussed above under the Background heading, during the threshing of crop material, slugs or large masses of crop material, rocks, and other hard objects, can be received in gap 34, so as to generate impulse forces, denoted by arrows FI in FIG. 3, which are transmitted by concave 32 to linkages 60, and by linkages 60 to arms 58, to axle 46, and to the above described elements of drive 40, e.g., gears 54, 56, motor 50 and bracket 44. These impulse loads can be generated in rapid and sustained succession, so as to have a jack hammer effect on drive 40, or they can be intermittent. The levels of the loads can also vary, as a function of various factors, such as rotor speed, crop loads, composition of a slug or rock, stone or the like. As a result, fatigue and other failure of components of drive 40 have been found to occur, including, but not limited to, bracket 44.

Referring now to FIGS. 4, 5, 6, 7, 8, 9 and 10, an alternative concave adjust assembly 64 constructed and operable according to the teachings of the present invention, for resisting damage from jack hammer impulse loads and overcoming the failure related problems discussed above, is shown, like parts of concave assembly 64 and assembly 40 being identified by like parts. Concave adjust assembly 64 includes a drive 42 mounted by a bracket 44 to housing 30 in the above described manner, drive 42 including a motor 50 having an output 52, including a gear 54 enmeshed with a gear 56. However, instead of being mounted on a solid or tubular axle such as axle 46, gear 56 is mounted on an elongate torsion axle 66 of the invention which differs in important ways from axle 46.

Figure 5:
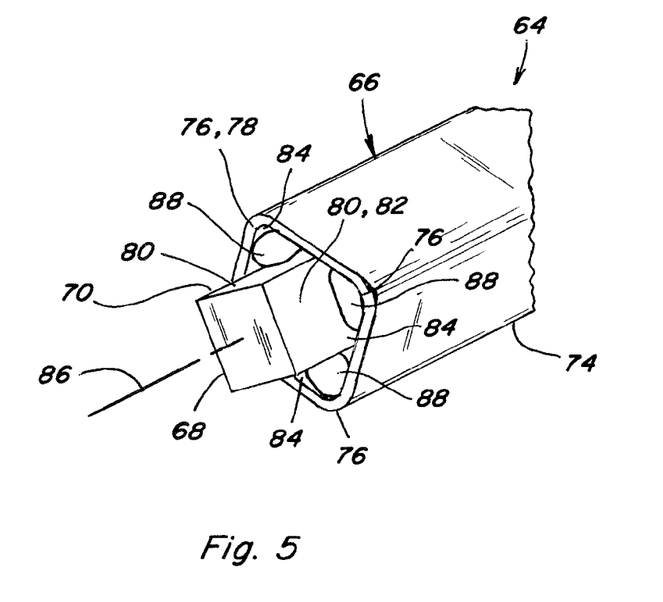
FIG. 5 is a fragmentary perspective view showing an end of the torsion axle of the invention.
Figure 6:
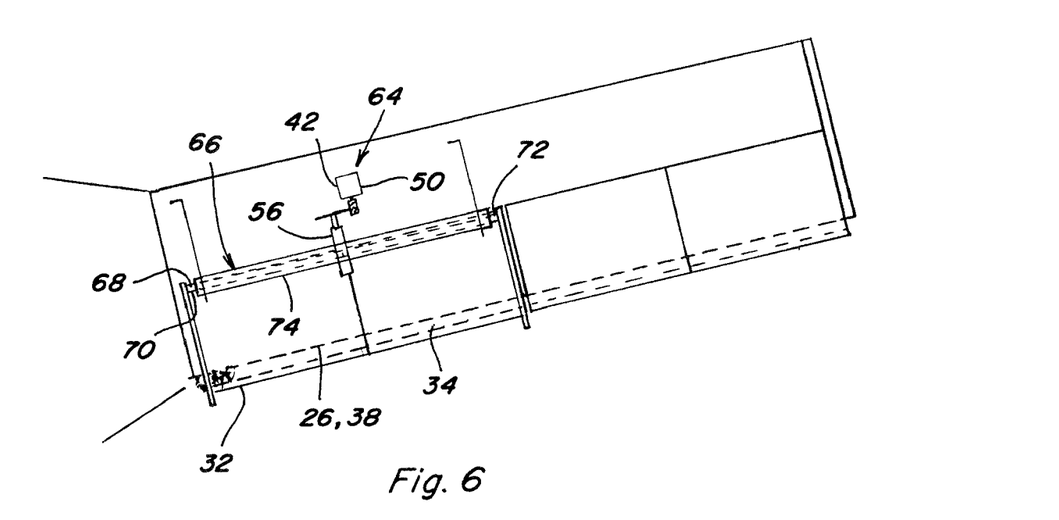
FIG. 6 is a simplified schematic side view of the threshing system with the torsion axle of the invention in support of the concave of the threshing system.
Figure 7:
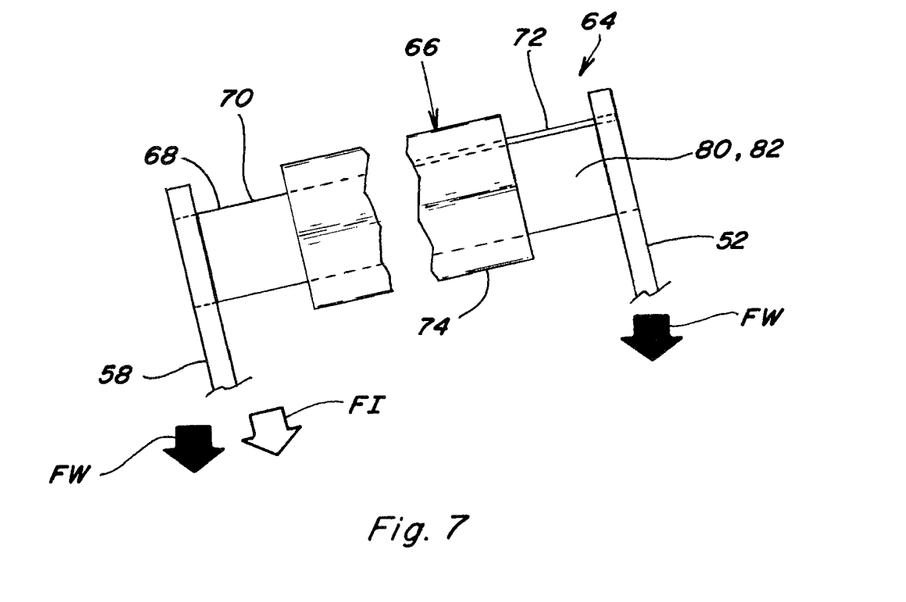
FIG. 7 is a simplified fragmentary schematic side view of the torsion axle showing loads applied to the ends thereof.
Figure 9:
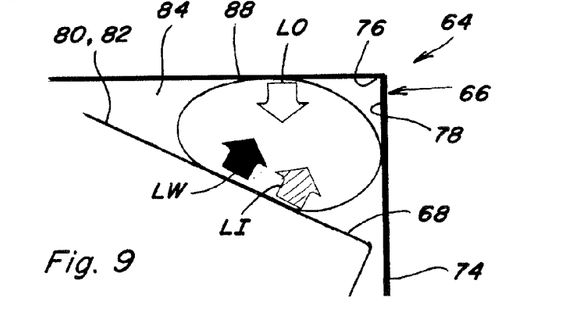
FIG. 9 is a simplified fragmentary schematic end view of the torsion axle showing loads exerted against a damping element thereof.

In particular, torsion axle 66 includes an elongate inner element 68 of a suitable material such as steel, having an angular sectional shape and opposite longitudinal ends 70 and 72 in connection with linkages 60 connecting to opposite ends of concave 32. Torsion axle 66 includes an elongate tubular outer element 74, also of a suitable material such as steel, disposed about inner element 68, outer element 74 having an angular sectional shape having a larger sectional extent or size than a sectional extent or size of inner element 68. And, outer element 74 is oriented in angular offset relation to inner element 68 such that corner portions 76 of an inner surface 78 of outer element 74 are disposed in generally opposing relation to flat portions 80 of an outer surface 82 of inner element 68, defining spaces 84 therebetween, as best shown in FIGS. 5 and 9. Here, inner and outer elements 68 and 74 preferably each have a rectangular shape and more preferably a square shape, such that spaces 84 are generally triangular shaped. Additionally, elements 68 and 74 are relatively rotatable laterally, that is, generally about a longitudinal axis 86 therethrough (FIG. 5).

Torsion axle 66 includes elongate resilient damping elements 88 disposed in spaces 84, respectively, such that forces urging the lateral relative rotation of outer element 74 and inner element 68 will act to exert compression forces against damping elements 88, respectively. Here, damping elements are preferably elongate cords of a resilient elastomeric material such as, but not limited to, a natural rubber, synthetic rubber, or a mixture of the two, although it should be recognized that other elastomeric polymers or other compositions could be used.

Figure 8:
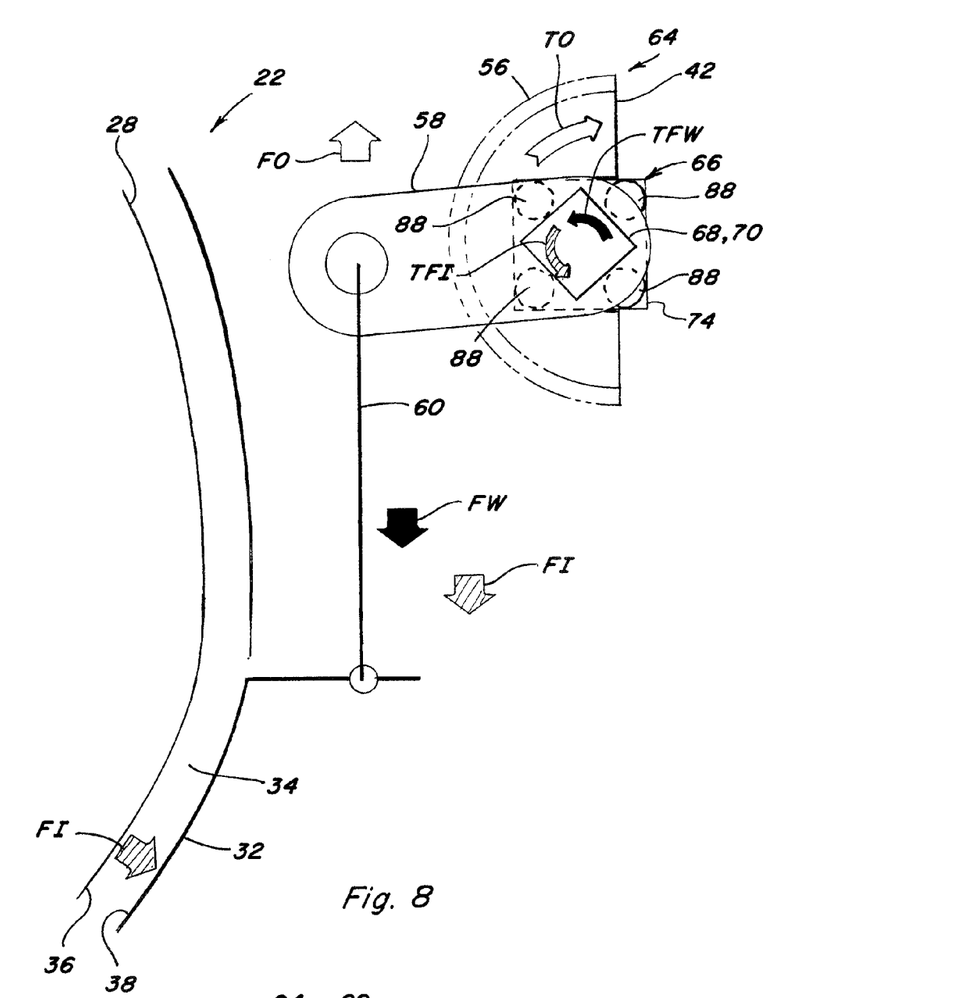
FIG. 8 is a simplified schematic end view of the threshing system and concave adjust assembly showing loads exerted against the torsion axle.

In operation, loads, such as the portion of the weight FW of concave 32, and impulse forces FI (FIG. 7), will be transmitted via linkages 60 to arms 58, so as to act to pull arms 58 downwardly, as best illustrated in FIG. 8. This loading will be transmitted to ends 70 and 72 of inner element 68, as denoted by torques TFW and TFI, respectively, which urge element 68 to rotate in the counterclockwise direction as shown, relative to outer element 74. As illustrated in FIG. 9, this will result in application of loads LW and LI by inner element 68, against damping elements 88. These loading conditions will be opposed by a force FO generated by drive 42, which will exert an equal counteracting torque TO, as required for holding concave 32 in a selected position, as also shown in FIG. 8. Drive 42 is capable of generating a force FO exceeding force FW which in the absence of force FI will act to lift the concave for reducing gap 34, and a reduced force FO to allow the concave to lower to increase the gap. Damping elements 88 are configured and disposed about inner element 68 for resiliently opposing relative rotation of elements 68 and 74, and preferably, to largely resist significant physical deformation when subjected to just loads LW exerted by the weight of the concave, to enable precisely setting gap 34. This is facilitated by a load distributive capability afforded by the length of damping elements 88, which can correspond to the length of torsion axle 64, and which can be several feet. Damping elements 88 are configured to deform to a greater but still limited extent when subjected to loads LI of greater magnitudes, as illustrated in FIG. 9, which is beneficial so as to absorb and damp loads LI, and prevent or substantially reduce transmission thereof past outer element 74, such that those forces that reach drive 42 will be of lower magnitude, again though, such that any changes to gap 34 will be minimal. As a result, the effects of impulse loads LI transmitted through outer element 74 to gears 54 and 56 are significantly reduced, so as to correspondingly reduce occurrence of consequential damage to the gears, as well as other components of drive 42, including bracket 44.

Figure 10:
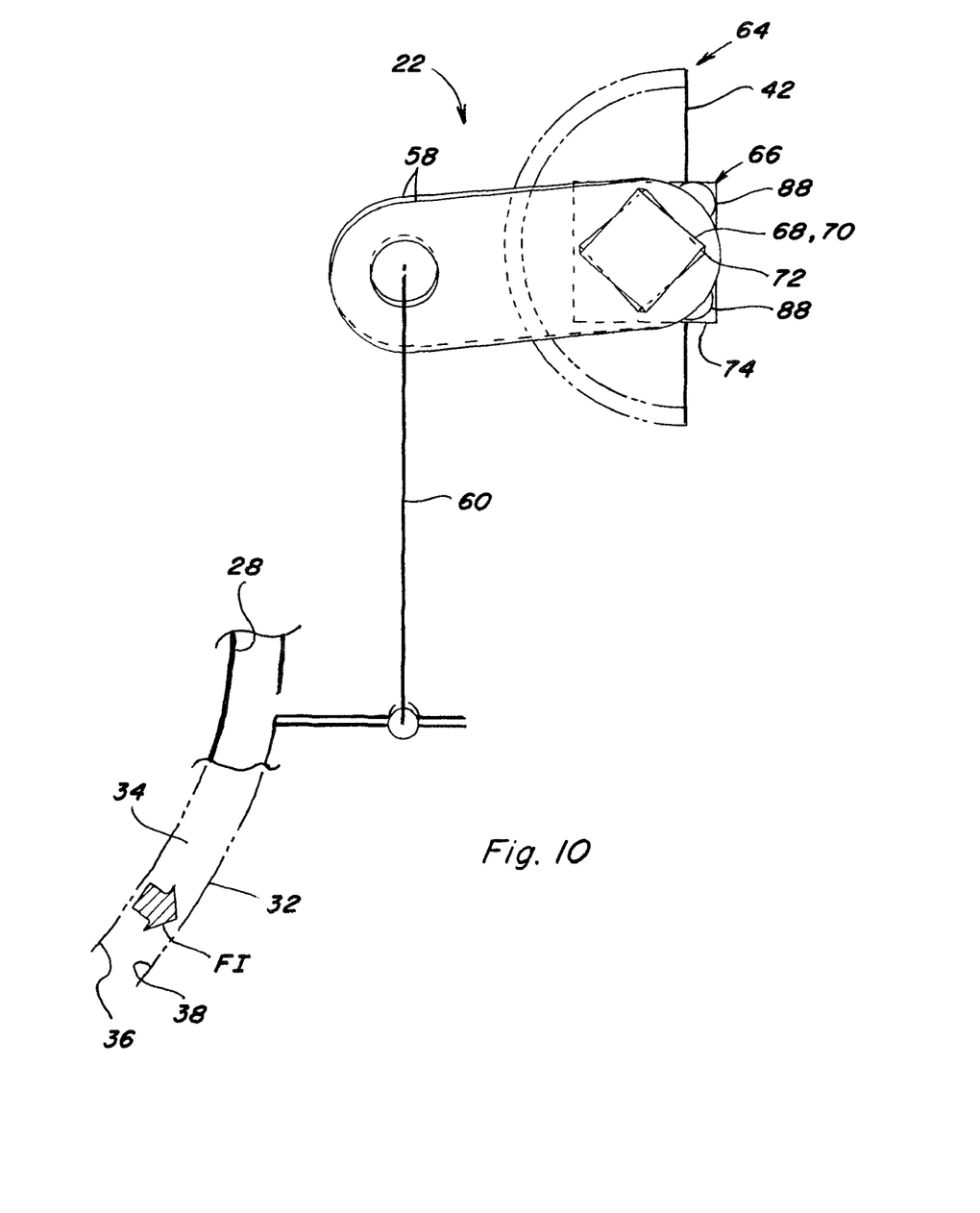
FIG. 10 is another simplified fragmentary schematic end view of the threshing system and concave adjust mechanism, illustrating a capability of torsional deformation of an inner element of the torsion axle under loads applied to the opposite ends thereof.

Referring more particularly to FIG. 10, as just noted, torsion axle 64 will typically have a length of several feet. Impulse loads generated during threshing can be exerted against axle 64 unevenly from end to end. For instance, an impulse loading condition may initially be exerted primarily against end 70 and move from end 70 toward end 72 of inner element 68 as a slug of material progresses along concave 32. Inner element 68 can be configured so as to also be resiliently twistable to a limited extent, as illustrated, so as to be capable of absorbing and damping such loads or a portion of the loads. This can be advantageous to distribute the loads more along the torsion axle, and also to minimize deformation of damping elements 88 and thus reduce any movement of concave 32.

As an alternative according to the invention, the torsion axle can be configured such that the inner element is connected to the drive, and the outer element connected to the concave. Thus, with this embodiment, in operation, with the outer element of the torsion axle connected in support of a concave, and the inner element connected to the drive, the motor can still be operated for adjusting the position of the concave relative to an adjacent rotor. Then, as slugs or other impulse or shock load generating conditions are encountered during threshing, the resulting impulse or shock loads will be transmitted through the outer element to the damping elements so as to be damped and dissipated, to substantially reduce or prevent transmission of potentially damage causing impulse loads to the inner element of the torsion axle, and thus to the drive.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A concave adjust assembly for a threshing system of an agricultural combine, comprising:
    an elongate torsion axle defining a longitudinal direction, the torsion axle including an inner element having an angular sectional shape and opposite longitudinal ends, a tubular outer element disposed about the inner element, the outer element having an angular sectional shape having a larger sectional extent than a sectional extent of the inner element and being oriented relative thereto such that corner portions of an inner surface of the outer element are disposed in generally opposing relation to flat portions of an outer surface of the inner element and define spaces therebetween and such that the outer element and the inner element are laterally relatively rotatable, and elongate resilient damping elements disposed in the spaces, respectively, such that forces exerted urging the lateral relative rotation of the outer element and the inner element will load the damping elements compressively, respectively; and
    a drive connected in rotatably driving relation to one of the inner element and the outer element and the other of the inner element and the outer element being connected to a concave of a threshing system of a combine, the drive including a motor mounted to fixed structure of the combine, such that operation of the motor will rotate the element connected thereto in a manner for moving the concave relative to the fixed structure, while the damping elements will damp impulse loads exerted thereagainst by the concave to limit or reduce transmission of the loads to the drive.

2. The assembly of claim 1, comprising the ends of the inner element being connected in cantilever relation to longitudinally spaced apart ends of a concave of a threshing system of a combine, and the motor being fixedly mounted on a housing of the threshing system, such that the operation of the motor in one manner will rotate enmeshed gears of the drive in a first lateral direction for moving the concave in a direction toward a rotor of the threshing system while exerting the compression forces against the damping elements, and impulse forces exerted by the concave in a direction away from the rotor will be in opposition to the compression forces, so as to absorbed and dissipated by the damping elements.

3. The assembly of claim 1, wherein the sectional shapes of the inner element and the outer element comprise rectangular shapes.

4. The assembly of claim 3, comprising four of the damping elements.

5. The assembly of claim 1, wherein the damping elements comprise cords of an elastomeric material.

6. The assembly of claim 5, wherein the elastomeric material is selected from a group consisting of a natural rubber, a synthetic rubber, and a combination of a natural rubber and a synthetic rubber.

7. The assembly of claim 1, wherein the drive comprises a gear mounted on the outer element at a location intermediate opposite longitudinal ends thereof.

8. A shock load damping concave adjust assembly for a threshing system of an agricultural combine, comprising:
    an elongate inner element defining a longitudinal direction, the inner element having an angular sectional shape and opposite longitudinal ends including laterally extending cantilever arms configured for connection to longitudinally spaced apart portions of a concave of the threshing system, respectively, an elongate tubular outer element disposed about the inner element along at least a substantial portion of the length thereof, the outer element having an angular sectional shape having a larger sectional extent than a sectional extent of the inner element and being oriented relative thereto such that corner portions of an inner surface of the outer element are disposed in generally opposing relation to flat portions of an outer surface of the inner element and define spaces therebetween and such that the outer element and the inner element are laterally relatively rotatable, and elongate resilient damping elements disposed in the spaces, respectively, and configured for opposing the lateral relative rotation of the inner element and the outer element to damp any lateral shock loads exerted therebetween; and
    a drive including a gear mounted on an outer surface of the outer element and enmeshed with a gear on an output shaft of a motor fixedly mountable to structure of a combine such that operation of the motor will relatively rotate the enmeshed gears.

9. The assembly of claim 8, further comprising a concave having ends connected to and supported by the cantilever arms of the inner element, respectively, and the motor being fixedly mounted on a structural element of the combine and the damping elements being configured, such that the operation of the motor in one manner will rotate the enmeshed gears in a first lateral direction for lifting the concave with only minimal or no lateral compression of the damping elements, while the damping elements will be laterally compressed when lateral shock loads are exerted thereagainst by the inner element for damping and dissipating the shock loads and reducing transmittal thereof to the drive.

10. The assembly of claim 8, wherein the sectional shapes of the inner element and the outer element comprise rectangular shapes.

11. The assembly of claim 8, comprising four of the damping elements.

12. The assembly of claim 8, wherein the damping elements comprise cords of an elastomeric material.

13. The assembly of claim 12, wherein the elastomeric material is selected from a group consisting of a natural rubber, a synthetic rubber, and a combination of a natural rubber and a synthetic rubber.

14. The assembly of claim 8, wherein the gear is mounted on the outer element at a location intermediate opposite longitudinal ends thereof.

15. An impulse load absorbing concave adjust assembly for a threshing system of an agricultural combine, comprising:
    an elongate inner element defining a longitudinal direction, the inner element having an angular sectional shape and opposite longitudinal ends including laterally extending cantilever arms connected to longitudinally spaced portions of a concave of the threshing system, respectively;
    an elongate tubular outer element disposed about the inner element along a substantial portion of the length thereof, the tubular outer element having an angular sectional shape having an extent larger than a sectional extent of the inner element and being oriented relative thereto such that corner portions of an inner surface of the outer element are disposed in generally opposing relation to flat portions of an outer surface of the inner element and define spaces therebetween and such that the inner element and the outer element are relatively rotatable about a longitudinal axis, and elongate resilient damping elements disposed in the spaces, respectively, and configured for opposing the relative rotation of the inner element and the outer element while absorbing lateral impulse loads exerted therebetween; and
    a drive fixedly mounted to the combine and supporting the outer element, the drive including a gear mounted on an outer surface of the outer element and enmeshed with a gear on an output shaft of a motor such that operation of the motor will relatively rotate the enmeshed gears, the damping elements being configured such that the operation of the motor in one manner will rotate the enmeshed gears in a first lateral direction for lifting the concave with only minimal or no compression of the damping elements, while the damping elements will laterally compress to a limited extent when lateral impulse loads are exerted thereagainst by the inner element for damping and dissipating the impulse loads and reducing transmittal thereof to the drive.

16. The assembly of claim 15, wherein the sectional shapes of the inner element and the outer element comprise rectangular shapes.

17. The assembly of claim 15, comprising four of the damping elements.

18. The assembly of claim 15, wherein the damping elements comprise cords of an elastomeric material.

19. The assembly of claim 18, wherein the elastomeric material is selected from a group consisting of a natural rubber, a synthetic rubber, and a combination of a natural rubber and a synthetic rubber.

20. The assembly of claim 15, wherein the gear is mounted on the outer element at a location intermediate opposite longitudinal ends thereof.

* * * * *